W. SONNBERG.
MACHINE FOR FILLING CARTRIDGE BELTS.
APPLICATION FILED JUNE 26, 1912.
1,196,893.
Patented Sept. 5, 1916.
5 SHEETS—SHEET 1.
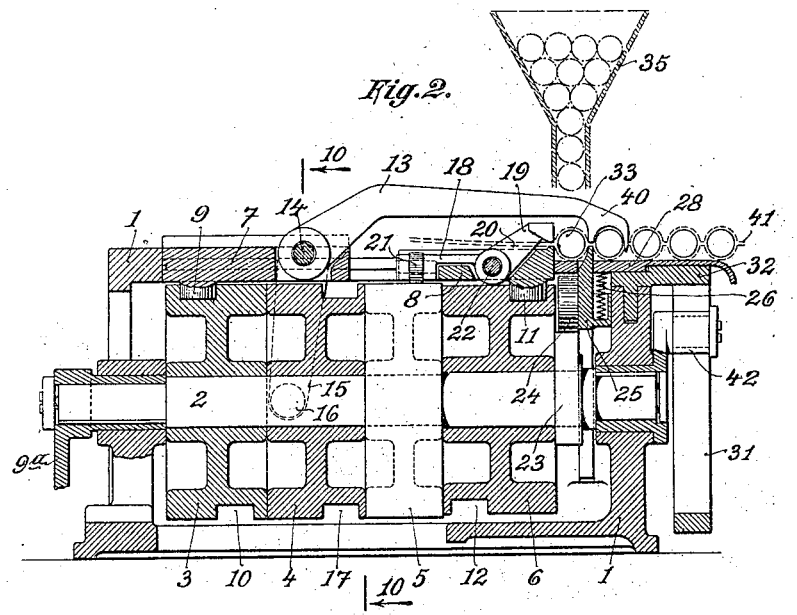
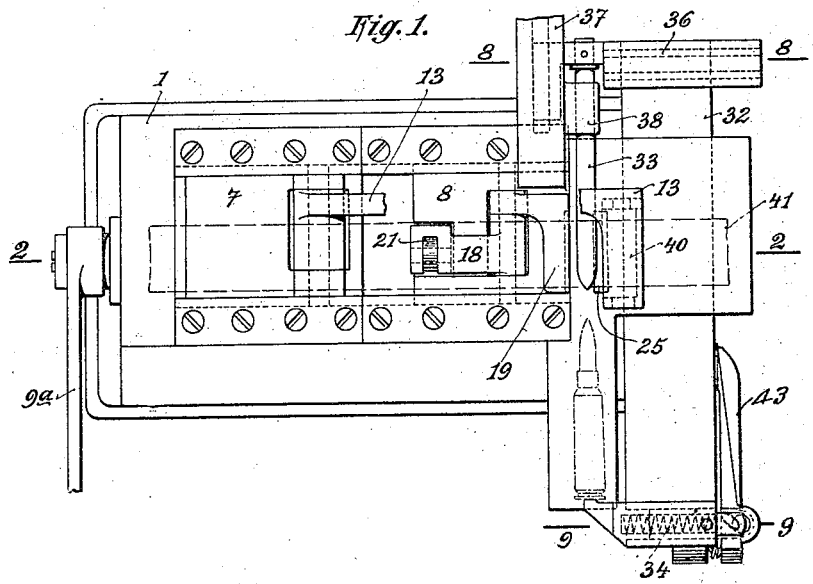
Witnesses:
William H. Card
S. Kraus
Inventor.
Wilhelm Sonnberg
per
Lawrence Langner
Attorney.

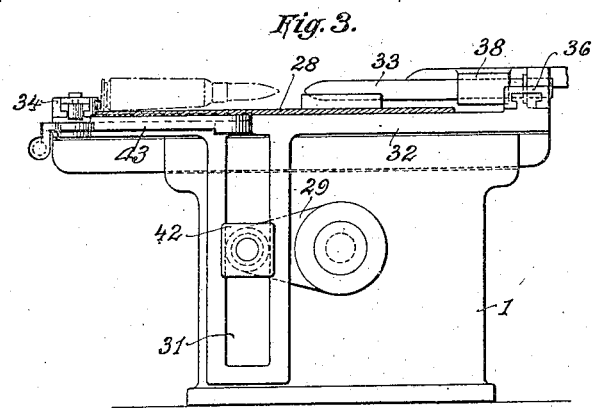
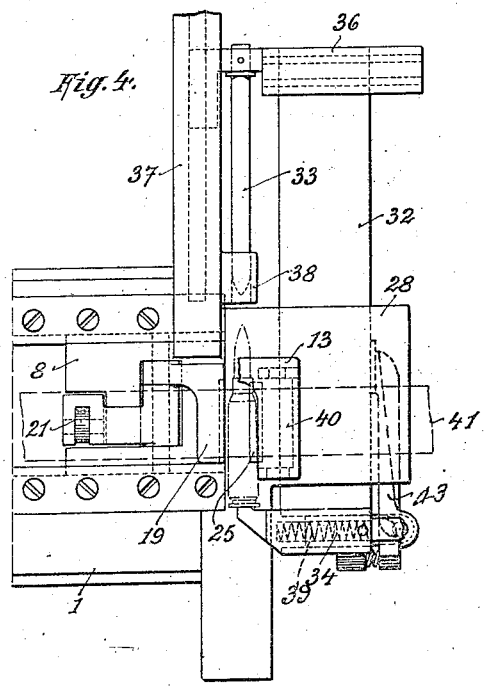

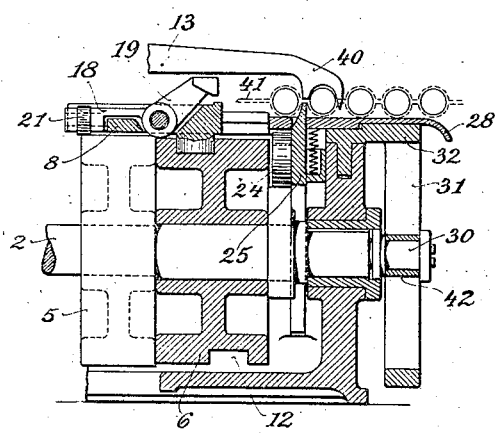
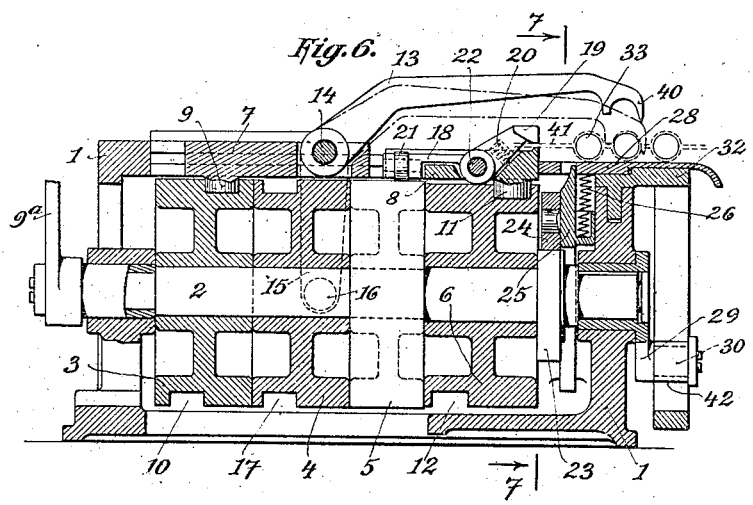

W. SONNBERG.
MACHINE FOR FILLING CARTRIDGE BELTS.
APPLICATION FILED JUNE 26, 1912.

1,196,893.

Patented Sept. 5, 1916.
5 SHEETS—SHEET 4.

Fig. 11.
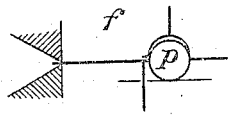
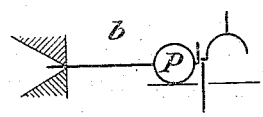
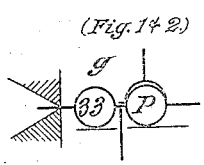
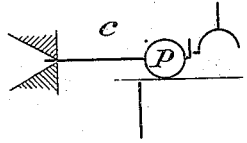
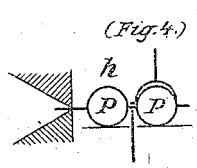
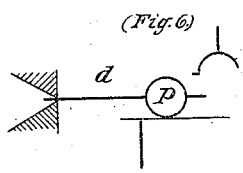
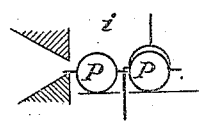
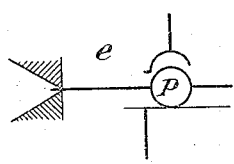
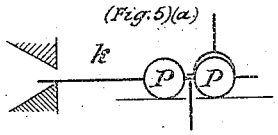

UNITED STATES PATENT OFFICE.

WILHELM SONNBERG, OF CHARLOTTENBURG, GERMANY, ASSIGNOR TO DEUTSCHE WAFFEN- UND MUNITIONSFABRIKEN, OF BERLIN, GERMANY.

MACHINE FOR FILLING CARTRIDGE-BELTS.

1,196,893.

Specification of Letters Patent.

Patented Sept. 5, 1916.

Application filed June 26, 1912. Serial No. 706,073.

*To all whom it may concern:*

Be it known that I, WILHELM SONNBERG, engineer, a subject of the King of Prussia, residing at No. 14 Mindenerstrasse, Charlottenburg, near Berlin, Germany, have invented certain new and useful Improvements in Machines for Filling Cartridge-Belts, of which the following is a specification.

The invention relates to a machine for filling cartridge belts for automatic small arms and machine guns. The machines of this kind of which I am aware are only utilizable for filling belts, in which the separate pockets are separated one from the other by riveted clips or the like, pins on the machine engaging in their eyes for the purpose of retaining and feeding the belt.

Now the present invention has for its object to provide a machine which is also suitable for filling belts which consist of two bands of fabric woven or stitched together at uniform intervals.

An embodiment of the invention is illustrated by way of example in the accompanying drawing, in which:—

Figure 7:
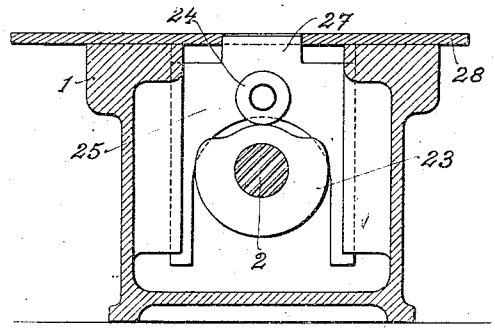
Figure 8:
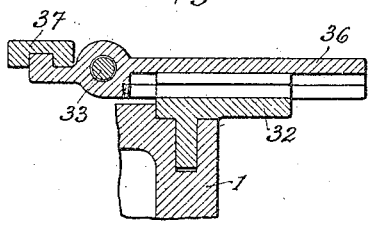
Figure 9:
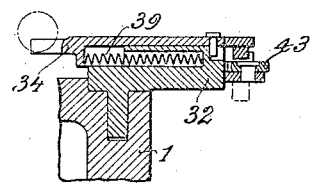
Figure 10:
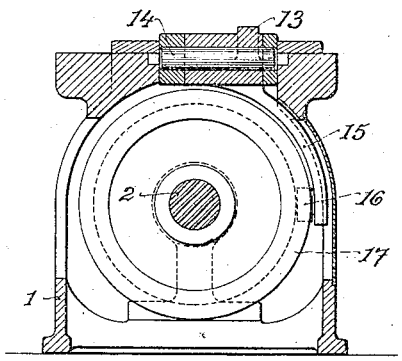

Figure 1 illustrates the machine in plan. Fig. 2 is a longitudinal section thereof on the line 2—2 in Fig. 1, the belt-retaining levers not being shown in section, however. Fig. 3 is a partial right hand side elevation. Figs. 4 to 6 are respectively a plan and longitudinal sections corresponding to Figs. 1 and 2 showing the machine in different positions. Fig. 7 is a cross section on the line 7—7 in Fig. 6. Fig. 8 is a vertical section of the pin carrier on the line 8—8 in Fig. 1. Fig. 9 is a vertical section of the cartridge slide on the line 9—9 in Fig. 1. Fig. 10 is a vertical cross section on the line 10—10 in Fig. 2, and Fig. 11 diagrammatically illustrates the order of the positions of the machine.

In a casing 1 a shaft 2 rotatable by means of a handle 9ª or in some other suitable manner is mounted and upon it four guide rollers 3, 4, 5 and 6 are fixed; by means of recesses or grooves on the peripheries these rollers control the slides and levers arranged above them. The roller 3 produces the reciprocating movement of the slide 7 parallel with the axis of the shaft and the roller 6 produces the movement of the slide 8 by means of inter-engaging pins and grooves 9, 10 and 11, 12; the roller 4 produces the rotation of the lever 13, pivoted to the slide 7 and ending in a jaw 40, about its pivot 14 by means of the pin 16 mounted in a second arm 15 on this lever which engages in a groove 17 on the roller 4. The arm 18 of the second retaining lever 19, which is provided with a roller 21 is constantly pressed onto the periphery of the roller 5 by means of a spring 20; the diameter of the roller 5 diminishes slightly in the right hand direction as shown in Fig. 5, so that when the roller 21 rests on this reduced portion the retaining lever 19 is rocked upward about its pivot 22 by the spring 20.

The shaft 2 also carries the cam plate 23 which acts on a roller 24 of a slide 25 vertically displaceable in the casing 1; this slide is constantly pressed downward by a spring 26 and its upper tapered end 27 passes through an opening in the table 28 (Figs. 2, 5 and 7).

The retaining levers and slides coöperate in such a manner that the slide 8 and the retaining lever 19 on the one hand and the slide 25 and the retaining lever 13 on the other hand temporarily hold the belt between them, displace it toward the right hand or release it.

The crank 29 is mounted on the right hand end of the shaft 2 (Figs. 3 and 6) and with its pin 30 and a slide block 42 engages in a slot 31 in a slide 32 which is horizontally displaceable beneath the table 28 in the casing 1. This slide 32 reciprocates, at right angles to the axis of the shaft, the pin 33 serving for opening and spreading out the pockets in the belt and also the cartridge slide 34. The cartridge slide removes the cartridge which for the time being is the lowest in the reservoir 35 and inserts it into the open pocket.

The pin 33 is fixed in a slide 36 (Fig. 8) which is displaceably mounted on the slide 32 parallel with the axis of the shaft and in an arm 37 of the slide 8 at right angles to this direction. The pin 33 is therefore displaced by the slide 8 parallel with the axis of the shaft and by the slide 32 perpendicularly thereto. The arm 37 is also provided with a guide 38 for the pin.

The cartridge slide 34 (Fig. 9) is mounted on the slide 32 with a limited capacity for movement parallel with the axis of the shaft and is constantly pressed outward by a spring 39 (Fig. 9). It is also acted upon by a guide lever 43 which temporarily holds it in the right hand end position.

The operation of the machine is as follows: In the first pocket of the cartridge belt 41 to be filled a cartridge P is first of all inserted by hand. The machine is then caused to occupy position $a$ (Fig. 11) by rotating the handle 9$^a$, the cartridge P contained in the belt being arranged on the left hand side of the jaw 40 of the lever 13 and the belt located left thereof inserted between the lever 19 which is now raised and the slide 8. By rotating the handle 9$^a$ to the left the lever 19 is pressed against the slide 8 thereby clamping the belt between them (position $b$). The two slides 7 and 8 then proceed toward the right until the slide 7 and the lever 13 have reached the right hand end position when the slide 25 moves downward (position $c$). While the slide 8, the lever 19 and the slide 25 retain their position the lever 13 rises (position $d$) returns with the slide 7 to the left hand end position (position $e$), and again descends whereby at the same time the slide 25 again rises (position $f$). The belt is therefore now clamped at two places between the grippers, that is to say at one place (between two adjacent pockets) between the lever 13 and the slide 25 and at another place (between the next adjacent pockets) between the slide 8 and the lever 19 and the jaw 40 of the lever 13 seizes the first cartridge P from above. In the further rotation of the handle the slide 8 with the lever 19 completes the right hand movement and simultaneously the pin 33 enters the belt pocket located between the two partitions held by the grippers and opens this pocket (position $g$). When the pin has fully entered the pocket the slide 32 displacing the pin has reached its end position in which the cartridge slide 34, which up to now has been retained by its guide lever 43, springs forward so that it is now in alinement with the pin 33 (Figs. 1 and 3). When the slide 32 moves back the lowest cartridge is inserted from the reservoir 35 in the pocket spread out by the pin which simultaneously withdraws from this pocket. The grippers and corresponding slides retain their position (position $h$) and therefore hold the belt firmly between them immediately beside the pocket to be filled (Fig. 4). After the slide 32 has reached its end position and the cartridge is therefore inserted in the pocket, the cartridge slide 34 is pressed out of the path of the cartridge toward the right by its guide lever. The lever 19 is now again raised (position $i$) and proceeds with its slide 8 into the left hand end position (position $k$) and again descends and clamps the belt on the slide 8 (position $b$). The operation then recommences. The positions $a$ and $k$ are the same with the difference that in position $a$ a fresh belt has been introduced into the machine. The cartridge belt is therefore securely and exactly held during the introduction of the pin and the cartridge and after a pocket has been filled it is fed forward the necessary amount.

What I claim and desire to secure by Letters Patent of the United States is:—

1. A machine for filling cartridge belts, comprising coöperating grippers adapted to clamp the belt between them and to reciprocate in the direction of feed.

2. In a machine for filling cartridge belts, coöperating means adapted to clamp the belt between them, and means to reciprocate said clamping means in the direction of feed.

3. A machine for filling cartridge belts comprising coöperating grippers adapted to clamp the belt between them at both sides of a pocket and to reciprocate in the direction of feed.

4. In a machine for filling cartridge belts, coöperating means adapted to clamp the belt between them, means adapted to grip the belt around a pocket, and means to reciprocate said clamping means and said gripping means in the direction of feed.

5. A machine for filling cartridge belts comprising reciprocating and coöperating belt feeding grippers adapted to clamp the belt between them during their feeding stroke.

6. In a machine for filling cartridge belts, means adapted to grip the belt around a pocket, and reciprocating belt feeding means adapted to clamp the belt between them.

7. In a machine for filling cartridge belts, means for opening the belt pockets, and coöperating means adapted to clamp the belt between them at both sides of a pocket during the opening of same and means for reciprocating said clamping means in the direction of feed.

8. In a machine for filling cartridge belts, means for introducing cartridges into the belt pockets, and coöperating means adapted to clamp the belt between them at both sides of a pocket during the introduction of a cartridge into same and means for reciprocating said clamping means in the direction of feed.

9. In a machine for filling cartridge belts, means for opening the belt pockets, means for introducing cartridges into the opened belt pockets, and coöperating means adapted to clamp the belt between them at both sides of a pocket during the insertion of said pocket opening means and of a cartridge into said pocket and means for reciprocating said clamping means in the direction of feed.

10. In a machine for filling cartridge belts, means for opening the belt pockets, means for introducing cartridges into the opened belt pockets, and coöperating reciprocating belt feeding means adapted to clamp the belt between them at both sides of a pocket during the insertion of said pocket opening means and of a cartridge into a pocket.

11. In a machine for filling cartridge belts, means for opening the belt pockets, means for introducing cartridges into the opened pockets, and coöperating means adapted to clamp the belt between them during the opening of a pocket and during the insertion of a cartridge into said opened pocket, and means for reciprocating said clamping means in the direction of feed.

12. In a machine for filling cartridge belts, means for opening the belt pockets, means for introducing cartridges into the opened belt pockets, and coöperating reciprocating belt feeding means adapted to clamp the belt between them during the feeding of the belt and during the insertion of said pocket opening means and of a cartridge into a pocket.

13. In a machine for filling cartridge belts, means for opening the belt pockets, means for introducing cartridges into the opened belt pocket, and coöperating reciprocating belt feeding means adapted to clamp the belt between them at both sides of a pocket during the feeding of the belt and during the insertion of said pocket opening means and of a cartridge into a pocket.

14. In a machine for filling cartridge belts, a base member, a member pivoted to said base member, means adapted to press said pivoted member upon said base member to clamp the belt between both members, and means adapted to reciprocate said base member in the direction of feed.

15. In a machine for filling cartridge belts, a slide, means to reciprocate said slide perpendicularly to the direction of feed, and a member coöperating with said slide to clamp the belt.

16. In a machine for filling cartridge belts, a slide, means to reciprocate said slide perpendicularly to the direction of feed, and a pivoted member coöperating with said slide to clamp the belt.

17. In a machine for filling cartridge belts, a slide, means to reciprocate said slide perpendicularly to the direction of feed, a member coöperating with said slide to clamp the belt, and means to reciprocate said member in the direction of feed.

18. In a machine for filing cartridge belts, a slide, means to reciprocate said slide perpendicularly to the direction of feed, and a member coöperating with said slide to clamp the belt and having a jaw adapted to grip the belt around a pocket.

19. A machine for filling cartridge belts comprising a slide displaceable in the direction of movement of the belt, a gripper pivoted to said slide, a vertically displaceable member, a second slide carrying a pivoted member displaceable in the direction of movement of the belt and adapted to grip the belt at the pockets.

20. A machine for filling cartridge belts comprising a slide displaceable in the direction of movement of the belt, a gripper pivoted to said slide, a vertically displaceable member, a second slide carrying a pivoted member displaceable in the direction of movement of the belt and adapted to grip the belt at the pockets, a third slide, a member mounted on said third slide to open the belt pockets, a hopper and a cartridge slide for feeding cartridges from said hopper into said pockets.

21. In a machine for filling cartridge belts, belt gripping means comprising a slide displaceable in the direction of feed, a coöperating lever pivoted to said slide and displaceable thereby in the same direction, said slide and lever acting together to clamp the belt between them and feed it during their displacement.

22. In a machine for filling cartridge belts, belt feeding and gripping means, comprising a slide displaceable in the direction of feed, a lever pivoted to said slide and a vertically displaceable slide coöperating with said lever.

23. In a machine for filling cartridge belts, belt feeding and gripping means, comprising a slide displaceable in the direction of feed, a lever pivoted thereto and formed at one end with a gripping jaw adapted to grip the belt around a pocket, and a vertically displaceable slide adapted to coöperate with said gripping jaw.

24. In a machine for filling cartridge belts, belt feeding means comprising a slide and a coöperating lever pivoted thereto, a pocket-opening pin displaceable by said slide in the direction of movement of the belt, a second slide adapted to advance said pin at substantially right angles to such movement to open the pockets on the belt, a cartridge slide adapted to be advanced by said second slide to insert cartridges in the open pockets, a guide lever for said cartridge slide, and grippers to hold the belt during the insertion of said pocket opening pin and during the introduction of the cartridges.

25. A machine for filling cartridge belts comprising a plurality of rotatable elements having cam surfaces thereon, a plurality of slides actuated by the operation of said rotary elements, a pivoted gripper carried by one of said slides and adapted to co-operate therewith to move the belt, a second pivoted gripper carried by the other of said slides and adapted to hold the belt during determined periods, an additional slide, a member mounted on said additional slide and adapted to open the belt pockets, and a cartridge slide for feeding cartridges into said pockets.

In testimony whereof I have affixed my signature in presence of two witnesses.

WILHELM SONNBERG.

Witnesses:
  ROBERT MICHALSKI,
  HENRY HASPER.